United States Patent [19]

Dillman et al.

[11] Patent Number: 5,332,783
[45] Date of Patent: Jul. 26, 1994

[54] COMPATIBLE BLENDS OF EPOXY RESINS AND EPOXIDIZED POLYDIENES

[75] Inventors: Steven H. Dillman, Houston; Michael A. Masse, Richmond; James R. Erickson, Katy, all of Tex.

[73] Assignee: Shell Oil Company, Houston, Tex.

[21] Appl. No.: 90,856

[22] Filed: Jul. 12, 1993

[51] Int. Cl.$^5$ .................. C08L 53/00; C08L 63/00; C08L 63/08

[52] U.S. Cl. ........................ 525/92; 525/98; 525/107; 525/113; 525/114; 525/122

[58] Field of Search ............ 525/92, 98, 314, 297, 525/65, 107, 114, 113

[56] References Cited

U.S. PATENT DOCUMENTS

| | | | |
|---|---|---|---|
| 4,237,245 | 12/1980 | Halasa et al. | 525/272 |
| 5,115,019 | 5/1992 | Marx et al. | 525/65 |
| 5,149,895 | 9/1992 | Coolbaugh et al. | 585/507 |
| 5,169,910 | 12/1992 | Corley . | |
| 5,191,024 | 5/1993 | Shibata et al. | 525/314 |
| 5,210,359 | 5/1993 | Coolbaugh et al. | 585/507 |
| 5,229,464 | 7/1993 | Erickson et al. . | |
| 5,247,026 | 9/1993 | Erickson et al. | 525/314 |

FOREIGN PATENT DOCUMENTS

0396780A1 11/1990 European Pat. Off. .
0441485A2 8/1991 European Pat. Off. .

*Primary Examiner*—James J. Seidleck
*Assistant Examiner*—Mark L. Warzel
*Attorney, Agent, or Firm*—Donald F. Haas

[57] ABSTRACT

A compatible polymer blend comprising: a curable aromatic epoxy resin, an epoxidized polydiene polymer, and an anhydride or polycarboxylic acid curing agent. The invention also relates to structural adhesive compositions comprising cured compatible polymer blends as described.

7 Claims, No Drawings

COMPATIBLE BLENDS OF EPOXY RESINS AND EPOXIDIZED POLYDIENES

BACKGROUND OF THE INVENTION

This invention relates to compatible blends of epoxy resins and epoxidized polydiene polymers. More specifically, the invention relates to blends of epoxy resins and epoxidized polydienes which are compatibilized and cured with anhydride curing agents.

Epoxy resins such as glycidyl ethers prepared by the reaction of epichlorohydrin with a compound containing at least one hydroxyl group carried out under alkaline reaction conditions are known to be useful in adhesives, and particularly in structural adhesives. Such epoxy resins are described in U.S. Pat. No. 5,169,910. Structural adhesives are bonding agents used to form permanent load bearing joints between adherands and generally should have the characteristics of high strength, good adhesion, and environmental resistance.

Structural adhesives containing such epoxy resins have the disadvantage that they tend to be inflexible and have low impact resistance.

Low viscosity epoxidized polydiene polymers are also known to be useful in adhesives. Such polymers are described in U.S. Pat. Nos. 5,224,464 and 5,247,026. These polymers have a relatively high degree of flexibility and also a relatively high impact resistance.

It would appear to be advantageous to blend the epoxy resins with the polydienes to obtain blends which have the desirable characteristics of both of the polymers, i.e., high strength along with good flexibility and impact resistance. However, it has been found that epoxy resins of this type are incompatible with polydienes. This is discussed in more detail in the examples below. Thus it is clear that it would be advantageous to be able to produce a compatible blend of an epoxy resin and an epoxidized polydiene. The present invention provides a blend of these two polymers which is compatibilized and cured by incorporating the same material, an anhydride curing agent.

SUMMARY OF THE INVENTION

This invention is a compatible polymer blend comprising a curable aromatic epoxy resin, an epoxidized polydiene polymer, an anhydride or polycarboxylic acid curing agent, and an accelerator. By virtue of the presence of the curing agent, the blend may be cured by baking in an oven at 200° to 350° F.

The preferred epoxy resins are glycidyl ethers prepared by the reaction of epichlorohydrin with an aromatic compound containing at least one hydroxy group carried out under alkaline reaction conditions. The preferred epoxidized polydiene polymers are low molecular weight low viscosity polymers which have a relatively small amount of epoxidation. The preferred anhydride curing agents are dodecenylsuccinic anhydride and hexahydrophthalic anhydride.

DETAILED DESCRIPTION OF THE INVENTION

The invention composition includes an epoxy resin. The epoxy resin component of the composition can be any curable resin having, on the average, more than one vicinal epoxide group per molecule and which has at least one aromatic group, and may bear substituents which do not materially interfere with the curing reaction.

Suitable epoxy resins include glycidyl ethers prepared by the reaction of epichlorohydrin with an aromatic compound containing at least one hydroxyl group carried out under alkaline reaction conditions. The epoxy resin products obtained when the hydroxyl group-containing compound is bisphenol-A are represented below by the structure below wherein n is zero or number greater than 0, commonly in the range of 0 to 10, preferably in the range of 0 to 2, and R is H or an alkyl group, preferably methyl or ethyl.

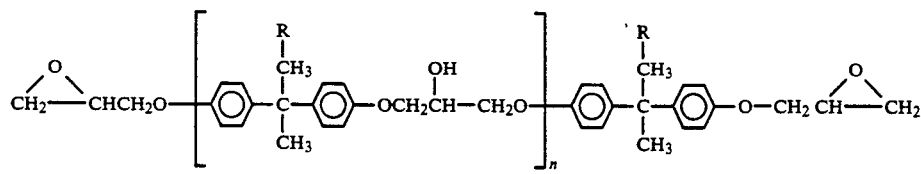

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 86 to about 10,000, preferably about 200 to about 1500. The commercially-available epoxy resin EPON® Resin 828, a reaction product of epichlorohydrin and 2,2-bis(4-hydroxyphenylpropane) (bisphenol-A) having a molecular weight of about 400, an epoxide equivalent (ASTM D-1652) of about 185-192, and an n value (from the formula above) of about 0.2, is presently the preferred epoxy resin because of its low viscosity and commercial availability.

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

The polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like, but it also may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

These polymers are epoxidized, whether they are hydrogenated or not, and it is preferred that the epoxidation take place only to the extent that about 0.1 to about 3 milliequivalents of epoxide per gram of polymer (0.1 to 3 Meq epoxide/g) are generated. Hence, the preferred epoxidized polymer has an epoxide equivalent weight of between about 10,000 and about 333.

Preferred block copolymers which are useful in the present invention have the formula $$(A-B-A_p)_n-Y_r-(A_q-B)_m$$

wherein Y is a coupling agent or coupling monomers or initiator, and wherein A and B are polymer blocks which may be homopolymer blocks of conjugated diolefin monomers, copolymer blocks of conjugated diolefin monomers, copolymer blocks of diolefin monomers and monoalkenyl aromatic hydrocarbon monomers or homopolymer blocks of monoalkenyl aromatic hydrocarbon monomers. These polymers are described in more detail in U.S. Pat. No. 5,229,464, which is herein incorporated by reference. Generally, it is preferred that the A blocks should have a greater concentration of more highly substituted aliphatic double bonds than the B blocks have. The A blocks have a molecular weight of from about 100 to about 3,000 and the B blocks have a molecular weight of from about 1000 to about 15,000. n is greater than 0, r is 0 or 1, m is greater than or equal to 0, and n+m ranges from 1 to 100. p and q may be 0 or 1.

Useful randomly epoxidized star polymers are described in U.S. Pat. No. 5,247,026 which is herein incorporated by reference. That application describes randomly epoxidized star polymers, based on at least one conjugated diolefin monomer, that contained di-, tri- and/or tetrasubstituted olefinic epoxides. The star polymers have greater than four arms or branches. Each arm has a molecular weight from 1500 to 15,000 and the concentration of di-, tri-, or tetrasubstituted olefinic epoxides (1,1-disubstituted, 1,2-disubstituted, 1,1,2-trisubstituted and 1,1,2,2-tetrasubstituted olefinic epoxides) is from 0.05 to 5 milliequivalents of epoxide per gram of polymer.

As will be described in more detail below in the examples, blends of the epoxy resins and epoxidized polymers described above are incompatible. For the purpose of this invention compatibility will be taken to mean able to form at least a well dispersed two phase mixture that is homogeneous in appearance. We have found that it is possible to compatibilize such blends by adding to the blends an anhydride curing agent. Such anhydride curing agents may be generally described as any compound containing one or more anhydride functional groups. Most commonly used anhydrides have an aromatic or cycloaliphatic structure. Examples include phthalic anhydride, tetrahydrophthalic anhydride, nadic methyl anhydride, hexahydrophthalic anhydride, pyromellitic anhydride, and dodecenylsuccinic anhydride. In addition, multifunctional carboxylic acids will provide similar performance. Preferred anhydride curing agents are those with an aliphatic character to increase compatability with the epoxidized polydiene. Dodecenylsuccinic anhydride and hexahydrophthalic anhydride have been found to work well in compatibilizing blends of epoxy resins and epoxidized polydienes.

It is highly advantageous that the compatibilizing agent is also a curing agent for the materials of the blend. This eliminates the use of extra materials and also allows the compatibilization and the curing to take place in one step. In order to cure this blend, a curing accelerator must be added. Suitable curing accelerators include trialkyl amines, hydroxyl-containing compounds and imidazoles. Benzyldimethylamine has been found to work well in curing the blends of the present invention.

The actual curing of the blends of the present invention should take place under the following conditions: cure temperature from 200°–450° F. with sufficient time to obtain a well cured material, generally from 20 minutes to 4 hours.

The cured blends of the present invention may be used in structural adhesive compositions. Epoxy resins are known for their utility in such compositions. The blends of the present invention should be more flexible and have a higher impact strength when used in a structural adhesive than structural adhesives using epoxy resins alone.

Various types of fillers can be included in the structural adhesive formulation. A wide variety of fillers can be used. Suitable fillers include calcium carbonate, clays, talcs, zinc oxide, titanium dioxide and the like. The amount of filler usually is in the range of 0 to about 65% w based on the solvent free portion of the formulation depending on the type of filler used and the application for which the adhesive is intended. An especially preferred filler is titanium dioxide.

Stabilizers known in the art may also be incorporated into the adhesive composition. These may be for protection during the life of the article against, for example, oxygen, ozone and ultra-violet radiation.

EXAMPLE 1

204 is a linear isoprene-styrene/butadiene-isoprene molecule containing 38.7% styrene. It has been partially hydrogenated and then epoxidized to a level of 1.0 meq/g. 205 is an isoprene-butadiene star polymer which has been coupled with 6% divinylbenzene (DVB). It also has been partially hydrogenated and then epoxidized to a level of 0.8 meq/g. 103 is a radial isoprene-butadiene polymer which has been coupled using silicon tetrachloride and has been epoxidized. Two versions of 103 were made: 103A was epoxidized to a level of 0.4 meq/g and 103B was epoxidized to a level of 1.0 meq/g.

All three of the above epoxidized polydiene polymers were blended with EPON® 828 resin and with EPON® 825 resin. The former resin is described above and 825 is a higher purity version of 828. Blends containing 90, 75, 50, 25, and 10 percent epoxidized polydiene polymer were made. The results are shown in Table 1 below.

TABLE 1

| | Compatibility Results | | |
|---|---|---|---|
| | | Component 1 | |
| Component 2 | 103 | 204 | 205 |
| EPON® 828 | 90,75,50,25,10% immiscible | 90,75,50,25,10% immiscible | 90,75,50,25,10% immiscible |
| EPON® 825 | 90,75,50,25,10% immiscible | 90,75,50,25,10% immiscible | 90,75,50,25,10% immiscible |

The results show that all five of the blends that were made for each of the epoxidized polydiene polymers were immiscible. Clearly, these two types of polymers are shown to be highly incompatible.

EXAMPLE 2

Several blends of EPON® 828 resin and polymer 103 from Example 1 were made. A stoichiometric amount of hexahydrophthalic anhydride (HHPA) was added as a compatibilizing and curing agent and one part per hundred polymer (pph) of benzyldimethylamine (BDMA) was added as a curing accelerator. The following mixing procedure was used: The epoxy resin, epoxidized polydiene, and anhydride were placed in a beaker and heated to 190° F., while being stirred with an air powered mixer. Once a homogeneous mix was obtained, the BDMA was added and the heating removed. Upon addition of BDMA there was a slight exotherm. Mixing was continued until the temperature began to decrease. The mixture was then degassed in a vacuum oven. The curing was carried out by baking at 250° F. for 45 minutes and then at 350° F. for 3 hours and 15 minutes. The results are shown in Table 2 below.

TABLE 2

| Descriptors | Weight % | Weight % | Weight % | Weight % | Weight % | Weight % |
|---|---|---|---|---|---|---|
| EPON® 828 | 100 | 80 | 60 | 40 | 20 | 0 |
| Polymer 103 | 0 | 20 | 40 | 60 | 80 | 100 |
| HHPA | 82 | 67 | 53 | 39 | 24 | 10 |
| Appearance | Excellent, clear | Excellent, opaque | Good, opaque | Poor, opaque | Could not be mixed | Excellent, clear |

Those blends described as "Excellent" were homogeneous with no evidence of large scale phase separation. The blend described as "good" was slightly tacky, evidence of a small amount of phase separated material on the surface. The blend described as "poor" had visibly phase separated.

It can be seen that the blends were compatible and curable up to about 60 percent of the epoxidized polydiene polymer. At 80 percent polymer 103, the blend could not be mixed.

EXAMPLE 3

Blends of EPON® 828 resin with the epoxidized polydiene polymers described in Example 1 were made at a ratio of 80 weight percent epoxy resin/20 weight percent epoxidized polydiene resin. A stoichiometric amount of dodecenylsuccinic anhydride was added as a compatibilizing and curing agent. One part per hundred of benzyl dimethyl amine was used as the accelerator (catalyst). The curing reactions were carried out by using the same procedure described in Example 2. Gels were measured as the toluene insoluble fraction, assuming that all of the toluene soluble material was epoxidized diene. Hence, we have a measure of the fraction of the epoxidized diene that is incorporated into the epoxy network. The results are shown in the following table.

TABLE 3

| Epoxidized Polydiene Polymer | 204 | 103A (0.4 Meq/ g epoxy) | 205 | 103B (1.0 Meq/ g epoxy) |
|---|---|---|---|---|
| Fraction of epoxidized polydiene in the gel (weight percent) | 69 | 25 | 84 | 87 |

It can be seen that the blend containing the 103A epoxidized polydiene polymer did not cure particularly well but that the others were sufficiently compatible and cured very well. 103A did not cure well because of the small number of epoxy groups on the molecule.

EXAMPLE 4

Blends of EPON® 828 resin with the epoxidized polydiene polymers described in Example 1 were made at a ratio of 80 weight percent epoxy resin/20 weight percent epoxidized polydiene resin. A stoichiometric amount of hexahydrophthalic anhydride was added as a compatibilizing and curing agent. One part per hundred of benzyl dimethyl amine was used as the accelerator (catalyst). The curing reactions were carried out using the same procedure described in Example 2. The results are shown in the following table.

TABLE 4

| Epoxidized Polydiene Polymer | 204 | 103A (0.4 Meq/ g epoxy) | 205 | 103B (1.0 Meq/ g epoxy) |
|---|---|---|---|---|
| Fraction of epoxidized polydiene in the gel (weight percent) | 22 | 68 | 66 | 75 |

It can be seen that while the linear polymer (204) did not cure particularly well, the other three polymers were sufficiently compatible and cured very well.

We claim:

1. A polymer blend having sufficient compatibility to form a homogeneous mixture comprising:
    (a) a curable aromatic epoxy resin, (b) up to 60% by weight of an epoxidized polydiene polymer, and (c) an anhydride or polycarboxylic acid curing agent; wherein the epoxidized polydiene has the formula $$(A-B-A_p)_n-Y_r-(A_q-B)_m$$

wherein Y is a coupling agent or coupling monomers or initiator, and A and B are polymer blocks which are homopolymer blocks of conjugated diolefin monomers, copolymer blocks of conjugated diolefin monomers, copolymer blocks of diolefin monomers and monoalkenyl aromatic hydrocarbon monomers or homopolymer blocks of monoalkenyl aromatic hydrocarbon monomers; and the A blocks have a peak molecular weight as measured by Gel Permeation Chromatography of from 100 to 3000 and the B blocks have a peak molecular weight as measured by Gel Permeation Chromatography of from 1000 to 15,000; and n is greater than 0, r is 0 or 1, m is greater than or equal to 0, the sum of n and m ranges from 1 to 100, and p and q may be 0 or 1.

2. The blend of claim 1 wherein an accelerator is added and the blend is cured.

3. A structural adhesive composition comprising the blend of claim 2.

4. The blend of claim 2 wherein the aromatic epoxy resin is a glycidyl ether prepared by the reaction of epichlorohydrin with an aromatic compound containing at least one hydroxy group carried out under alkaline reaction conditions.

5. The blend of claim 2 wherein the epoxidized polydiene polymer is a randomly epoxidized star polymer containing at least one conjugated diolefin monomer and having greater than four arms wherein each arm has a molecular weight of from 1500 to 15,000.

6. The blend of claim 2 wherein the anhydride curing agent is selected from the group consisting of phthalic anhydride, substituted phthalic anhydrides, and hydrophthalic anhydrides.

7. The blend of claim 2 wherein the anhydride is selected from the group consisting of dodecenylsuccinic anhydride and hexahydrophthalic anhydride.

* * * * *